(12) United States Patent
Kim

(10) Patent No.: US 7,502,559 B2
(45) Date of Patent: Mar. 10, 2009

(54) CAMERA LENS ASSEMBLY FOR MOBILE PHONE

(75) Inventor: Dae-Hwan Kim, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 359 days.

(21) Appl. No.: 11/298,374

(22) Filed: Dec. 9, 2005

(65) Prior Publication Data

US 2006/0147191 A1    Jul. 6, 2006

(30) Foreign Application Priority Data

Dec. 30, 2004  (KR)  ............... 10-2004-0116408

(51) Int. Cl.
*G03B 15/03* (2006.01)
(52) U.S. Cl. ............ 396/182; 396/225; 396/307; 348/239
(58) Field of Classification Search ........ 348/239, 348/278; 396/225, 307
See application file for complete search history.

(56) References Cited

U.S. PATENT DOCUMENTS

2004/0169763 A1*   9/2004   Ikeda ................ 348/340

FOREIGN PATENT DOCUMENTS

| CA | 1215571 | * 12/1986 |
|---|---|---|
| JP | 2004-048481 | 2/2004 |

OTHER PUBLICATIONS

Mitchell; Photographic Science; 1984; John WIley & Sons; p. 343-345.*

* cited by examiner

*Primary Examiner*—W. B. Perkey
*Assistant Examiner*—Michael A Strieb
(74) *Attorney, Agent, or Firm*—The Farrell Law Firm, PC

(57) ABSTRACT

Provided is a camera lens assembly including an optical filter employing a plurality of color light emitting diodes. The camera lens assembly includes a lens module having a printed circuit board, an image sensor positioned on the printed circuit board, an IR filter, and a camera lens, the camera lens assembly. The camera lens assembly further includes a base, a lens housing positioned on an upper surface of the base for accommodating the lens module, and formed with a lens aperture at a position corresponding to the camera lens, and an optical filter positioned adjacent to the lens module for selectively transmitting or blocking a color light radiated from a plurality of color light emitting diodes through the lens aperture.

8 Claims, 5 Drawing Sheets

_US 7,502,559 B2_

CAMERA LENS ASSEMBLY FOR MOBILE PHONE

PRIORITY

This application claims priority to an application entitled "Camera Lens Assembly For Mobile Phone" filed in the Korean Industrial Property Office on Dec. 30, 2004 and assigned Serial No. 2004-116408, the contents of which are hereby incorporated by reference.

BACKGROUND OF THE INVENTION

1. Field of the Invention

The present invention relates to a camera lens assembly for a mobile phone, and more particularly to a camera lens assembly including an optical filter employing a plurality of color light emitting diodes.

2. Description of the Related Art

Charge coupled devices (CCD) are used to convert an optical image into an electrical signal in many image sensing applications. For example, video cameras, electronic still cameras, PC camera, mobile terminals, and PDAs, all use CCDs, also referred to as a camera lens module.

Conventional mobile terminals use a camera lens module to pickup images. A user can talk over video communication, or take a picture of a subject.

As a result, conventional mobile terminals have developed into high-powered multifunction machines with a camera capable of capturing, storing and transmitting images.

A typical camera lens module includes a lens, and a diaphragm that focuses an image onto an image sensor. Image data output from the image sensor is converted to a digital signal by a converter, which is then stored in memory.

CMOS image sensors employ a switch mode to detect output one by one, using as many MOS transistors as the number of pixels. The pixels are made by the CMOS technique that employs a control circuit and a signal processing circuit as peripheral circuits. Since the CMOS image sensor consumes little power, it is very useful for mobile phones and personal digital assistants.

FIG. 1 is a cross-sectional view of a conventional camera lens module 1 for a mobile phone. Referring to FIG. 1, the camera lens module 1 includes a printed circuit board 2, an image sensor 3 positioned on the printed circuit board 2, an IR filter 4 positioned above the image sensor 3, a lens mount 5 enclosing the image sensor 3 and the IR filter 4, a camera lens 6 positioned above the IR filter 4, and a lens holder 7 positioned on the lens mount 5 for accommodating the camera lens 6, and formed with a lens aperture 7a.

The lens holder 7 has a flexible circuit 8 electrically connected to the printed circuit board 2. The flexible circuit 8 is provided with a connector 9 through which the flexible circuit is connected to a CPU (not shown) in a body (not shown) of the terminal.

The camera lens module 1 may employ only a basic function of the lens 6, and further includes a light emitting diode (LED) (not shown) that acts as a flash when needed.

In a conventional camera, various filters (not shown) may be mounted onto the aperture formed at the lens holder to achieve several effects. As such, filters may be mounted on the camera lens.

Since conventional camera lens modules are small, when filters are mounted onto the lens, the front of the lens inevitably protrudes outward, making it highly susceptible to damage. In addition, the lens becomes larger, impeding miniaturization of the camera lens module. Although one filter may be mounted onto the lens during manufacture, it is difficult to simultaneously mount various filters with various functions onto the lens.

SUMMARY OF THE INVENTION

Accordingly, the present invention has been made to solve the above-mentioned problems contained in the prior art, and an object of the present invention is to provide a camera lens assembly including an optical filter employing a plurality of color light emitting diodes, by which the assembly can achieve various filtering functions and image changing functions.

Another object of the present invention is to provide a camera lens assembly including an optical filter having various filtering functions, which makes it unnecessary to mount some kinds of separate filters onto a lens, thereby reducing dimensions of the camera lens assembly and thus enabling its miniaturization.

To accomplish this object, there is provided a camera lens assembly for a mobile phone, the camera lens assembly including a camera lens module having a printed circuit board, an image sensor positioned on the printed circuit board, an IR filter, and a camera lens, the camera lens assembly including: a base; a lens housing positioned on an upper surface of the base for accommodating the lens module, and formed with a lens aperture at a position corresponding to the camera lens; and an optical filter positioned adjacent to the lens module for selectively transmitting a color light radiated from a plurality of color light emitting diodes through the lens aperture.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Figure 1:
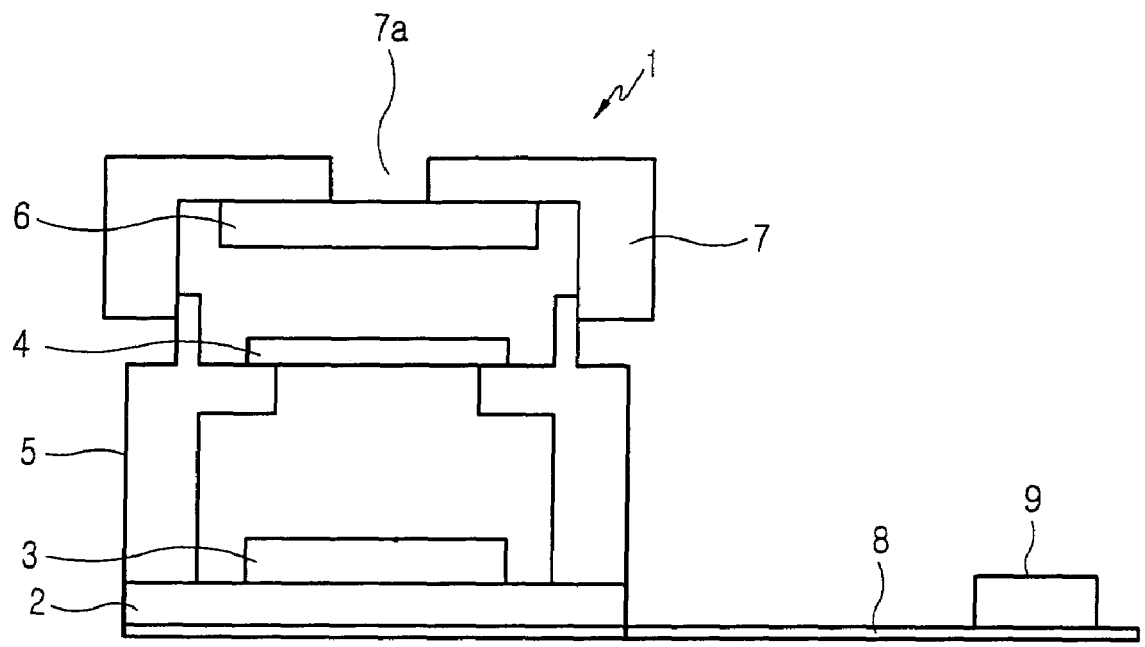
FIG. 1 is a cross-sectional view of a conventional camera lens module.

Hereinafter, preferred embodiments of the present invention will be described with reference to the accompanying drawings. In the following description, the same elements will be designated by the same reference numerals although they are shown in different drawings.

Figure 2:
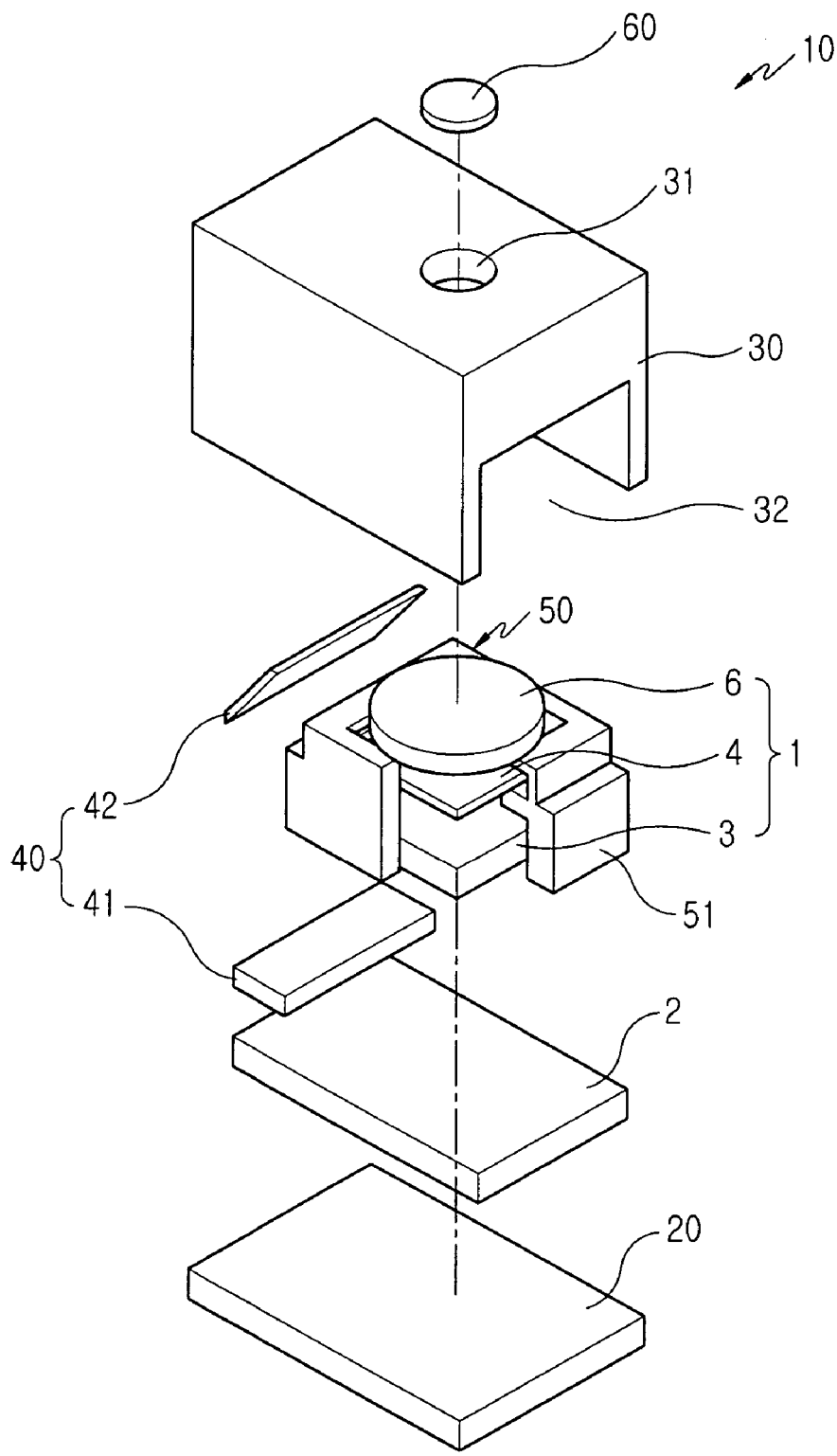
FIG. 2 is an exploded perspective view of a camera lens assembly for a mobile phone according to an embodiment of the present invention.
Figure 3:
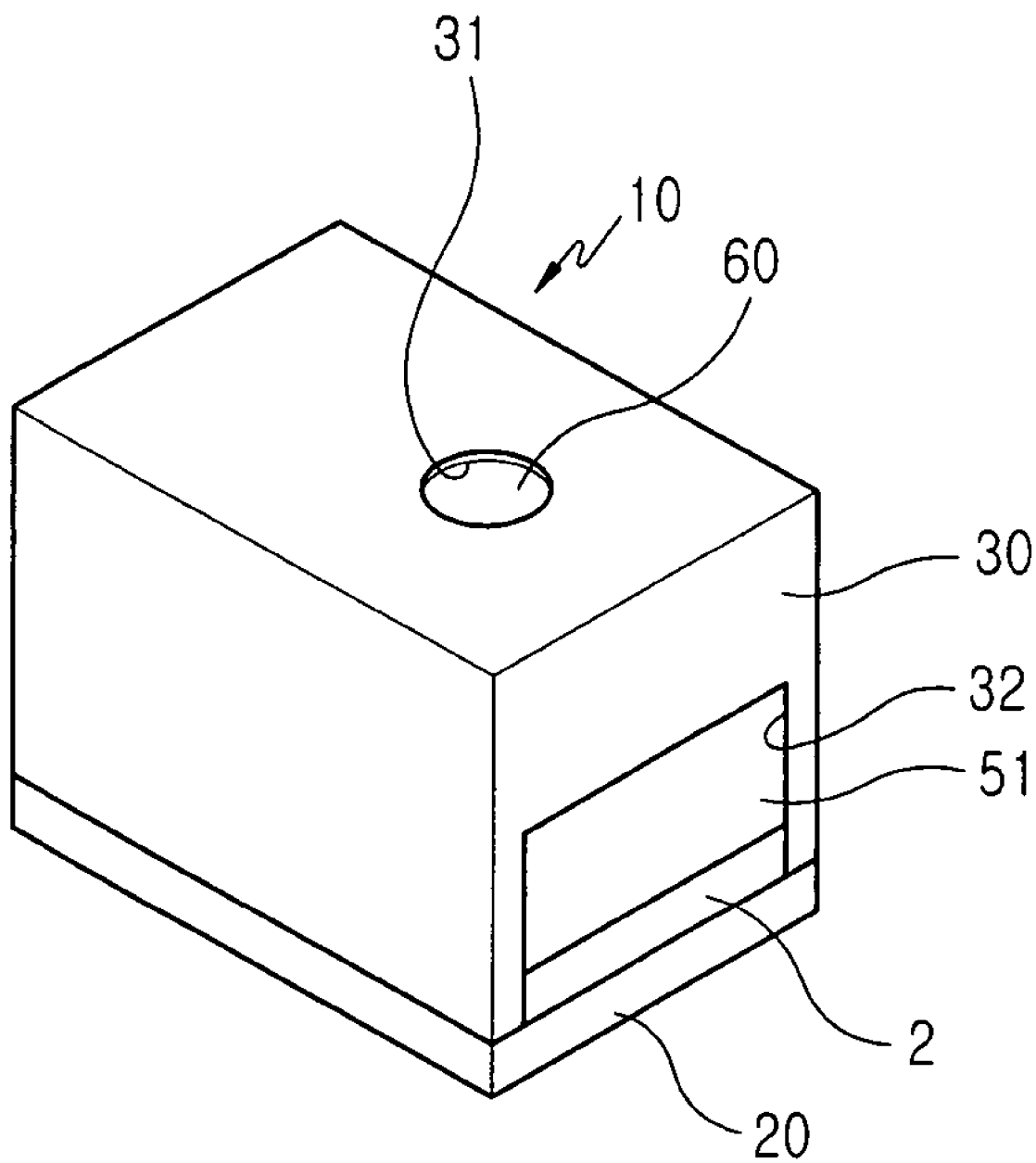
FIG. 3 is a perspective view of a camera lens assembly for a mobile phone according to an embodiment of the present invention.

As shown in FIGS. 2 and 3, a camera lens assembly 10 for a mobile phone includes a base 20, a lens housing 30, and an optical filter 40. The base 20 is adapted so that the camera lens module 1 and the lens housing 30 are mounted onto the base. The lens housing 30 is positioned on an upper surface of the base to accommodate the lens module 1, and is formed with a lens aperture 31 at a position adjacent to the camera lens 6. The optical filter 40 is positioned adjacent to the lens module 1 to selectively transmit a color light radiated from a plurality of color light emitting diodes 41 through the lens aperture 31.

Referring to FIG. 2, the optical filter 40 includes a plurality of light emitting diodes 41 and a diode reflecting plate 42. The color light diodes 41 are positioned on the upper surface of the base 20 to radiate various color lights. The diode reflecting plate 42 is positioned to reflect the light radiated from the color emitting diodes 41 onto the lens aperture 31.

Figure 4:
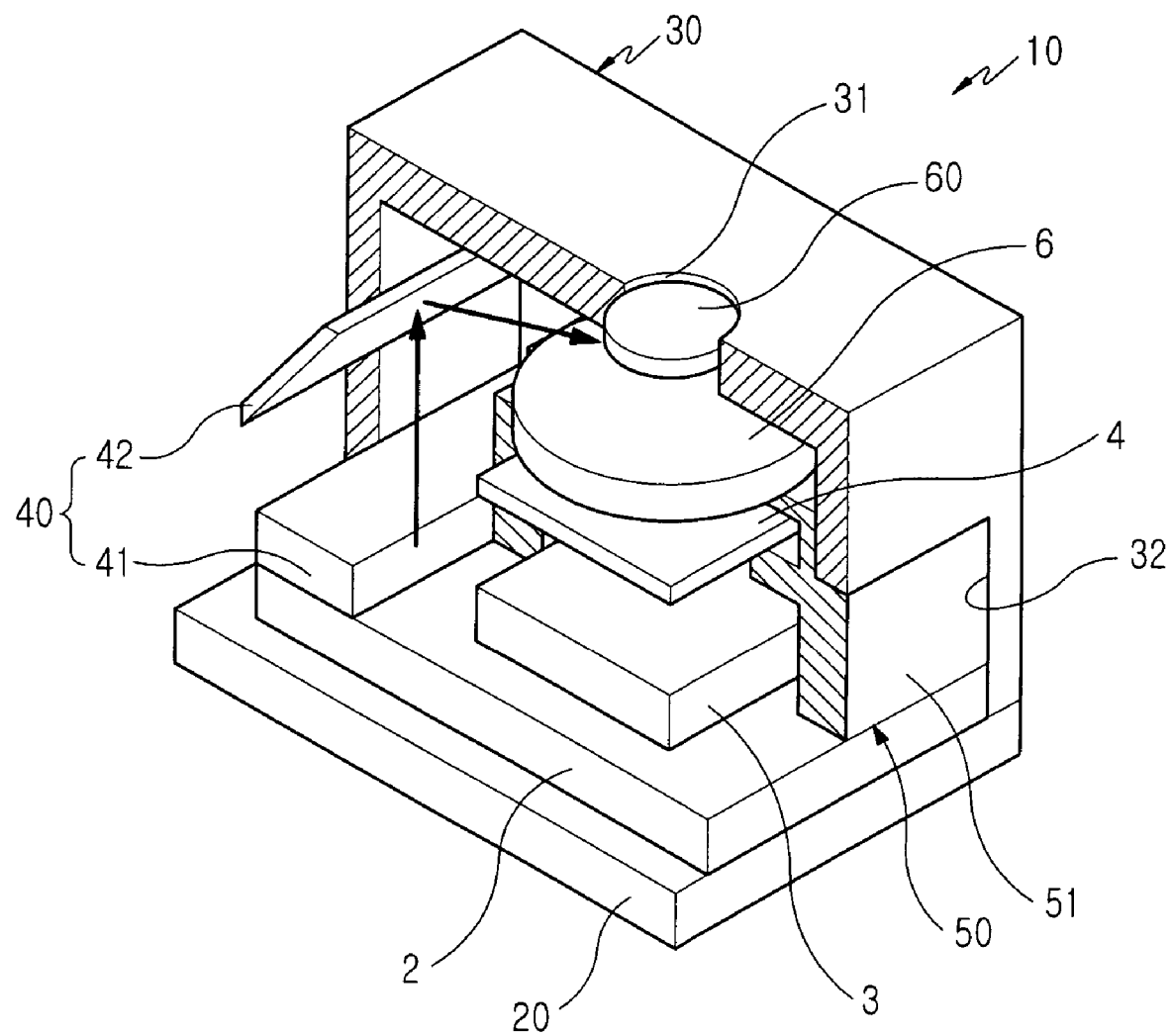
FIG. 4 is a partially sectional schematic view depicting an operating state of the camera lens assembly of FIG. 3.

As shown in FIG. 4, the printed circuit board 2 is provided on an upper surface thereof with an image sensor 3 and an IR filter 4. A lens mount 50 is installed onto the upper surface of the printed circuit board 2 to retain the camera lens 6. The lens housing has a fixing opening 32 which is connected to a connection 51 provided on the lens mount 50.

Figure 5:
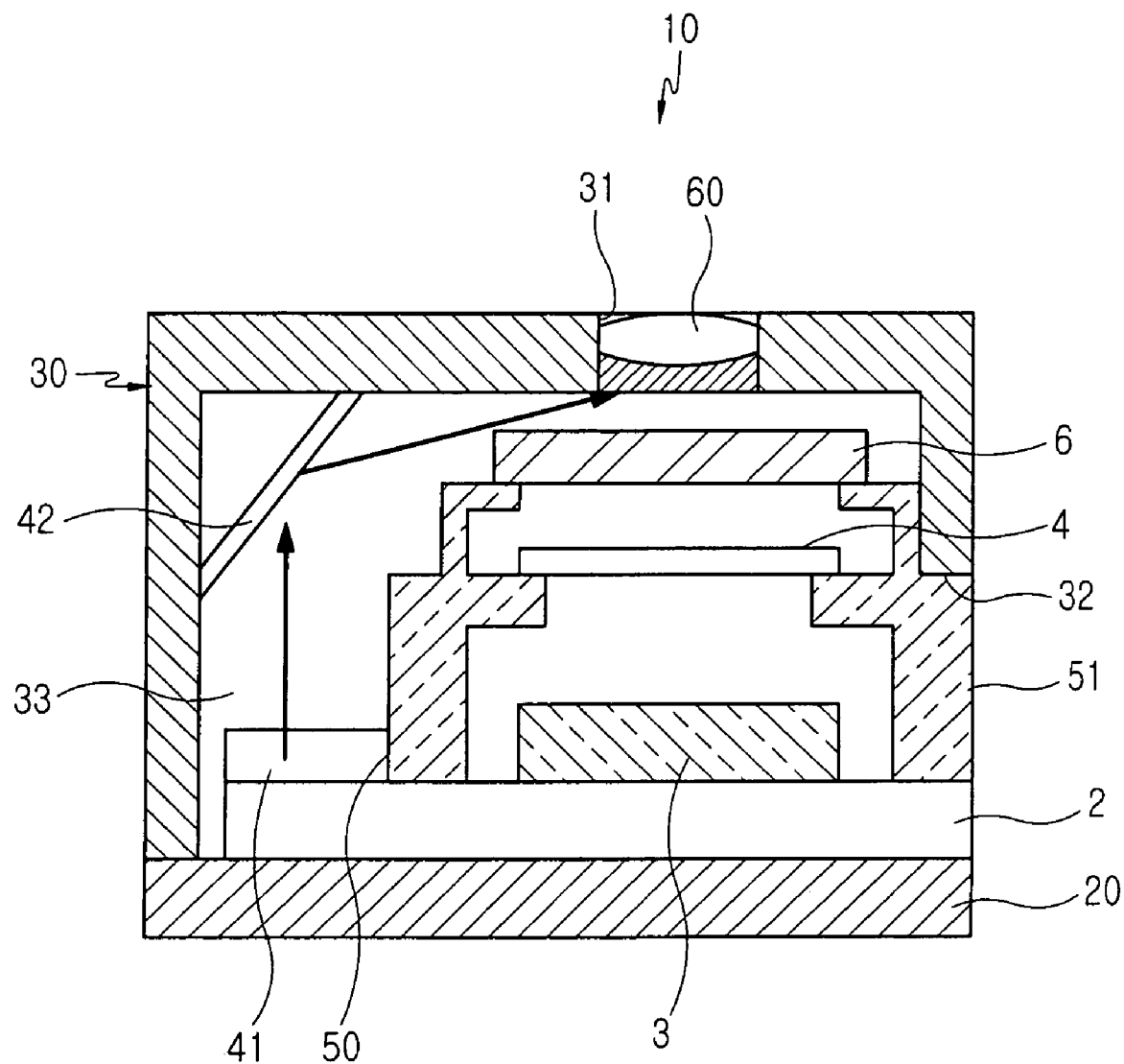
FIG. 5 is a cross-sectional view depicting an operating state of the camera lens assembly of FIG. 4.

Referring to FIG. 5, an optical glass 60 positioned in the lens aperture 31 The lens housing 30 has a space 33 to accommodate the plurality of color light emitting diodes 41 and the diode reflecting plate 42.

Preferably the color light emitting diodes 41 are adapted to radiate seven colors including white, red, magenta, yellow, green and cyan.

A yellow-light emitting diode 41 may be used as a correction filter where the camera lens assembly 10 is in a picturing mode. When yellow light is illuminated onto the optical glass 60, it reproduces bright and dark phases of the subject, to visually match the feeling of a user.

A red-light emitting diode 41 may be used as a contrast filter where the lens module 1 is in a picturing mode. When a red light is illuminated onto the optical glass 60, the optical glass 60 can transmit or absorb a specific wavelength of light.

Operation of the camera lens assembly for mobile phone according to an embodiment of the present invention will now be described in detail with reference to FIGS. 2 through 5.

Referring to FIGS. 2 and 3, the printed circuit board 2, the image sensor 3, the IR filter 4, and the camera lens 6 are sequentially placed on the upper surface of the base 20, one on top of the other and then the lens housing 30 is mounted onto the base 20.

The lens aperture 31 formed at the lens housing 30 is positioned to correspond, that is, be adjacent to the camera lens 6.

As described above, the base 20 is on the upper surface thereof with the optical filter 40 selectively transmits or blocks the color light radiated from the color light emitting diodes 41 through the lens aperture 31 to the camera lens 6.

As shown in FIG. 5, the optical glass 60 positioned in the lens aperture 31.

In FIG. 4, since the lens housing 30 is formed at the side thereof with a fixing opening 32 which is connected to the connection 51 provided at the lens mount 50, the connection 51 of the lens mount 50 is coupled to the fixing opening 32 of the lens housing 30 when the lens housing is mounted to the base 20.

A plurality of the color light emitting diodes 41 are preferably adapted to radiate seven colors including white, red, magenta, yellow, green and cyan.

As shown in FIGS. 4 and 5, when the user uses the camera lens assembly 10 to take pictures, and the optical filter 40 is employed as a correction filter, the yellow-light emitting diode 41 is operated in such a way that yellow light is illuminated onto the optical glass 60, by reflecting the yellow light from the diode reflecting plate.

Yellow light is illuminated onto a lower portion of the optical glass 60, and it reproduces bright and dark phases of the subject in a tone close to a visible feeling of the user.

When the optical filter 40 is employed as a contrast filter, the red-light emitting diode 41 is operated in such a way that red light is illuminated onto the optical glass 60 by reflecting the red light from the diode reflecting plate 42. The red light is illuminated onto the lower portion of the optical glass 60, and the optical glass 60 transmits or absorbs a specific wavelength of light.

As such, the present invention can achieve various filtering and image changing functions of the camera lens assembly by utilizing a plurality of color light emitting diodes.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A camera lens assembly for a mobile phone having a camera lens module including a printed circuit board, an image sensor positioned on the printed circuit board, an IR filter, and a camera lens, the camera lens assembly comprising:
   a base;
   a lens housing positioned on a base upper surface of the base for accommodating the camera lens module, and formed with a lens aperture of the lens housing at a position corresponding to the camera lens;
   an optical glass disposed in the lens aperture; and
   an optical filter positioned adjacent to the camera lens module for selectively transmitting a color light radiated from a plurality of color light emitting diodes onto the optical glass so that the optical glass transmits or absorbs a specific wavelength of light coming through the lens aperture.

2. The camera lens assembly as claimed in claim 1, wherein the color light emitting diodes are provided at a position on the base upper surface to radiate the color light; and
   the optical filter includes a diode reflecting plate positioned adjacent the color light emitting diodes to reflect the color light onto the optical glass.

3. The camera lens assembly as claimed in claim 1, wherein the image sensor and the IR filter are provided on an upper surface of the printed circuit board, and a lens mount for retaining the camera lens is installed onto the upper surface of the printed circuit board.

4. The camera lens assembly as claimed in claim 3, wherein the lens housing includes a fixing opening connected to a connection provided at the lens mount.

5. The camera lens assembly as claimed in claim 2, wherein the lens housing is provided with a space for accommodating the plurality of color light emitting diodes and the diode reflecting plate therein.

6. The camera lens assembly as claimed in claim 1, wherein the color light includes at least one of light colors of white, red, magenta, yellow, green and cyan.

7. The camera lens assembly as claimed in claim 6, wherein a yellow-light emitting diode is used as a correction filter in such a way that when yellow light is illuminated onto the optical glass, the optical glass reproduces bright and dark phases of a subject; and
   wherein a red-light emitting diode is used as a contrast filter in such a way that when a red light is illuminated onto the optical glass, the optical glass transmits or absorbs a specific wavelength of the light coming through the lens aperture.

8. A camera lens assembly for a mobile phone having a lens module including a camera lens, the camera lens assembly comprising:
   a base;

a lens housing positioned on an upper surface of the base for accommodating the lens module, and formed with a lens aperture of the lens housing at a position corresponding to the camera lens;
an optical glass disposed in the lens aperture; and
an optical filter positioned adjacent to the lens module for selectively transmitting a color light radiated from a plurality of color light emitting diodes onto the optical glass so that the optical glass transmits or absorbs a specific wavelength of light coming through the lens aperture.

* * * * *